United States Patent Office 3,354,237
Patented Nov. 21, 1967

3,354,237
ADHESIVE COMPOSITIONS OF POLYURETHANE ELASTOMER AND OIL-SOLUBLE PHENOLIC RESIN
Fred D. Shaw, Wilmington, Del., assignor to E. I. du Pont de Nemours and Company, Wilmington, Del., a corporation of Delaware
No Drawing. Filed Aug. 28, 1964, Ser. No. 392,928
8 Claims. (Cl. 260—829)

ABSTRACT OF THE DISCLOSURE

The present invention is directed to an adhesive composition consisting essentially of a polyurethane elastomer and an oil-soluble phenolic resin in the parts ratio hereinafter described. These novel adhesive compositions may be employed as solutions, contact adhesives, hot melt adhesives, and heat activated or solvent activated adhesives for joining a wide selection of substances.

---

Adhesives which contain isocyanates or isocyanate derivatives are well known. Among these are conventional elastomer-based solvent cements containing a minor proportion of an isocyanate. Bond formation with these adhesives appears to involve reaction of isocyanato groups of the isocyanate with the substrate, atmospheric moisture, or an added chain-extending or cross-linking agent or polymerization of isocyanato groups. A disadvantage of such adhesive resides in the high reactivity of the isocyanato groups, which limits the stability of the adhesive in storage and during use. In those compositions where curing agents are required, a further disadvantage resides in the time limit on the setting of the adhesive once the curing agent has been added.

These disadvantages have been avoided by steam curing isocyanato-terminated prepolymers of propylene ether glycol to obtain polyurethane/polyurea compositions which are thermoplastic in nature. The disadvantage of these cured compounds, however, is the requirement of high temperatures and pressures, of the order of 225° C. and 150 p.s.i., for bond formation. These conditions are often inconvenient and prevent the use of such products for bonding heat sensitive materials.

It is an object of the present invention to provide polyurethane adhesive compositions which are stable in storage and during use and which form adhesive bonds having properties without curing which are characteristic of conventional cross-linked elastomers. Another object is to provide novel adhesive compositions for which bond formation can be effected in many ways and which are suitable for bonding a wide variety of materials. Other objects will appear hereinafter.

These and other objects of the present invention are accomplished by the adhesive composition consisting essentially of (a) 20 parts by weight of a thermoplastic-secondary polyurethane elastomer and (b) 5 to 80 parts by weight of a phenolic resin, divalent metal salts of oil-soluble phenolic resins, the divalent metal being selected from the group consisting of magnesium, calcium, cadmium, barium, and lead, and mixtures thereof. The polyurethane elastomer (a) can be of two classes, the first class consisting essentially of the recurring units —O—G—O—, O—B—O—, and —D—, all connected by the bi-acyl radical

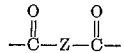

and the second class consisting essentially of the recurring units —O—G—O— and —O—B'—O— connected by the bi-acyl radical

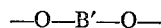

For both of these classes of polyurethane elastomers, —O—G—O— is a biradical obtained by removing the hydroxyl hydrogen atoms of a polyalkylene ether glycol having a molecular weight of 800 to 3000, and —Z— is a biradical obtained by removing the amine hydrogens from a diamine selected from the group consisting of piperazine, 2 - methylpiperazine, 2,5 - dimethylpiperazine, and 2,3,5,6-tetramethylpiperazine. In addition, for the first class of elastomer (a), —O—B—O— is a biradical obtained by removing the hydroxyl hydrogen atoms from a glycol having a molecular weight of less than about 200 and —D— is selected from the group consisting of —CH$_2$—CH$_2$—, —CH$_2$—CH$_2$—CH$_2$—CH$_2$—, and mixtures thereof, with the molar ratios of —O—G—O—, —O—B—O—, and —D— being 1.0:1–3:0.75–1.5, respectively. For the second class of elastomer (a),

—O—B'—O— is a biradical obtained by removing the hydroxyl hydrogen atoms from a glycol selected from the group consisting of butanediol-1,4, neopentyl glycol, and mixtures thereof, with the molar ratios of —O—G—O— and —O—B'—O— being 1.0:1.0–10.0.

Thus, the first class of thermoplastic polyurethanes used in the preparation of the novel adhesive of this invention is derived from four types of structural units employed in specific proportions, and the second class of polyurethanes is derived from three structural units. All of the elastomers so provided are essentially linear as is evidenced by solubility and thermoplastic properties, but at ambient temperature, they exhibit physical properties which are characteristic of conventional cross-linked elastomers.

To further explain the above-described structural recurring units, —O—G—O— is a biradical obtained by removing the hydroxyl hydrogen atoms from a polyether glycol, HO—G—OH, having an average molecular weight of 800 to 3000. This unit is required in both classes of polyurethanes covered by this invention. Polyalkyleneether glycols are the preferred glycols for preparing the elastomers. They may be represented by the general formula HO(RO)$_n$H, wherein R is an alkylene radical which may be the same or different and $n$ is an integer selected to give a molecular weight of about 800 to 3000. These glycols can be prepared by known methods involving polymerization of cyclic ethers such as alkylene oxides and tetrahydrofuran. Polytetramethyleneether glycol and polypropyleneether glycol are preferred. Related polyether glycols, such as polyalkyleneetherthioether glycols and polyalkylene-aryleneether glycols, may also be used to provide this structural unit.

The unit —O—B—O— is a biradical obtained by removing the hydroxyl hydrogen atoms from a glycol having a molecular weight below 200. The glycols used to furnish this unit should contain aliphatic hydroxyl groups. The biradical —B— may be substituted with alkyl, aryl, alkoxy, aryloxy and alkenyl groups. The biradical —B— may be aliphatic, cycloaliphatic, or aliphatic-aromatic as long as both glycol hydroxyls are linked to aliphatic carbons. Suitable glycols include ethylene glycol, 1,2-propylene glycol, 1,3-butanediol, 1,4-butanediol, neopentyl glycol, 1,5 - pentanediol, 2-methyl-1,4-butanediol, 2-ethyl-2-methyl - 1,3 - propanediol, 2-butyl-2-methyl-1,3-propanediol, 2 - allyloxymethyl-2-methyl-1,3-propanediol, cyclohexanediol, diethylene glycol and 1,4-bis(2-hydroxyethoxy) benzene. Of these glycols, butanediol-1,4 and

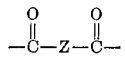

neopentyl glycol are preferred. Mixtures of glycols may be employed to advantage on occasion.

The unit —O—B'—O— may be derived from butanediol-1,4, neopentyl glycol or mixtures thereof. When other glycols are employed, the resultant adhesive bonds are inferior.

The unit —D— is an alkylene radical selected from the group —CH$_2$—CH$_2$—, —CH$_2$—CH$_2$—CH$_2$—CH$_2$— and mixtures thereof. The unit may be derived from a dicarboxylic acid, HOOC—D—COOH, or a derivative thereof. This unit is not required in the second class of polyurethane elastomers.

The structural unit referred to as

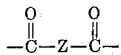

is a bi-acyl radical wherein —Z— represents the radical obtained by removing the amine hydrogens from a diamine selected from the group consisting of piperazine, 2-methylpiperazine, 2,5-dimethylpiperazine and 2,3,5,6-tetramethylpiperazine. The biradical

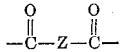

serves as a connecting link between the other structural units. It is present in both classes of elastomers covered by the invention.

For polyurethanes of the first class, 1 to 3 moles of —O—B—O units derived from a low molecular weight glycol must be present for each mole of polyether glycol. When less than 1 mole of —O—B—O— units are present, the thermoplastic elastomer may be too high melting to be useful in the present compositions. When more than 3 moles of —O—B—O units are present, the polymer may lack the necessary toughness to provide adhesives having good cohesive strength. For each mole of polyether glycol, 0.75 to 1.5 moles of —D— units must also be provided. In this instance, greater amounts give high melting elastomers and lesser amounts yield elastomers lacking toughness. The number of

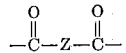

units contained in the elastomers is about equivalent to the sum of the other 3 types of units present because the

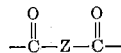

units serve to link the other types of units as mentioned before. For the polyurethanes in this class, it is preferred that the combined units

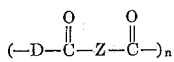

in the copolymer are situated so that the average value of $n$ is greater than one.

In the case of the polyurethanes of the second class, from about 1 to 10 moles of —O—B'—O— units may be employed per mole of polyether glycol units,

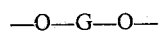

In this instance, the number of

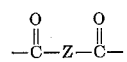

units is about equivalent to the sum of —O—B'—O— and —O—G—O— units. Lower proportions of

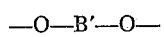

units yield lower melting, relatively soft elastomers, while high proportions of these units yield high melting, relatively hard elastomers. Ratios of 2 to 5 moles of —O—B'—O— units per mole of —O—G—O— units are preferred. Polyurethanes of this class are generally described in U.S. Patent No. 2,929,802.

The thermoplastic elastomers required in the compositions of this invention are most conveniently prepared by reacting a mixture of the bishaloformates of the glycol components, with piperazine or a substituted piperazine as named, and in the case of the first class of polyurethanes, a diacid halide

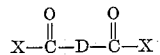

The bishaloformates are

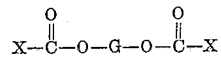

and

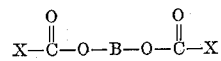

or

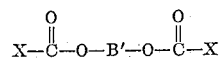

In these formulas X may be chlorine or bromine. The best procedure for effecting this reaction may be described as a solution/interfacial polymerization. Briefly, this polymerization involves (1) partially reacting the mixture of bishaloformates and optionally diacid halide, dissolved in an inert water-immiscible solvent, with piperazine or a substituted piperazine and (2) adding an aqueous solution of an acid acceptor such as sodium carbonate to neutralize the hydrogen halide generated during the reaction so that all of the added piperazine is made available for reaction with the bishaloformates.

The required bishaloformates for use in this procedure may be either chloro- or bromo- derivatives, but the bischloroformates are preferred. The bischloroformates are conveniently prepared by adding polyether glycols, low molecular weight glycols or mixtures thereof to an excess of liquid phosgene and refluxing the resulting mixture for about 12 hours. Following the reaction, hydrogen chloride and excess phosgene are removed by passing a stream of dry nitrogen through the reaction mass. The bisbromoformates may be formed similarly from glycols and carbonyl bromide. Preparation of the diacid halides, which may also be either chloro- or bromo- derivatives, with chlorides preferred, is well known.

The inert water-immiscible solvents which are used in the solution/interfacial polymerization should be capable of dissolving the polymeric reaction product. The solvent should not react at an appreciable rate with the reactants. In addition, it is usually desirable to use a low-boiling solvent to facilitate isolation of the polymer. Many halogenated aliphatic hydrocarbon solvents have been found to be useful for carrying out the polymerization. Halogenated hydrocarbons containing the group, —CHX$_2$, wherein X is bromine or chloride, are usually very good solvents and preferred examples include methylene chloride, chloroform, 1,1,2-trichloroethane and 1,1,2,2-tetrachloroethane. In carrying out the solution/interfacial polymerization, the mixture of two or three acid halide components is usually diluted to about a 10% by weight concentration in the inert solvent selected. Piperazine or a substituted piperazine can be added as a solid, but preferably is added as a solution in the same solvent employed for the halide components. The concentration of the piperazine solution may have any convenient value but concentrations around 2% by weight are preferred.

The aqueous solution of acid acceptor which is added after partial reaction between the halides and piperazine is required to react with hydrogen halide acid formed as a by-product during polymerization. The preferred acid acceptor is sodium carbonate which can be conveniently employed as a 10% aqueous solution. Other suitable acceptors include sodium hydroxide, sodium bicarbonate and potassium bicarbonate. An excess of piperazine may also be used as an acceptor, but the excess should be added as an aqueous solution. If a very large excess of piperazine is added directly to the mixture of halides in the inert solvent solution, the molecular weight of the product may be lowered. Tertiary amines, such as triethylamine and pyridine, may also be used as acid acceptors but should again be added in aqueous solution so that the latter stages of the reaction will occur under conditions of interfacial polymerization.

When the elastomers used in the adhesive compositions of the present invention are prepared by the solution/interfacial polymerization, piperazine or substituted piperazine may be conveniently employed in excesses of 1% to 10% of that calculated to be required for reaction with the mixture of the two or three acid halides. This excess is exclusive of any piperazine added as an acid acceptor. Because of the interfacial technique employed in the latter part of the polymerization, which apparently limits the availability of piperazine, an excess of piperazine does not lower the molecular weight of the polymer. However, if sufficient piperazine is not present, the molecular weight of the polymer will be low. Rather than attempt to add the exact amount of piperazine required and risk being short on piperazine, it is usually preferred to add the limited excess named.

The solution/interfacial polymerization can be performed batchwise by preparing a solution in a suitable solvent of the two bishaloformates and optionally diacid halide in a vessel equipped for vigorous shearing agitation, such as a Waring Blendor. To this solution is added piperazine or substituted piperazine either as a solid or in solution. This addition may be started at room temperature and should be performed as rapidly as possible without causing the reaction mass to boil over. Within about 30–60 seconds after the addition of the piperazine is started, 10% aqueous sodium carbonate is added as rapidly as possible. Since the reaction is exothermic, the temperature will rise but will not exceed the boiling point of the solvent as long as solvent may evaporate. Control of the temperature without the loss of excessive amounts of solvent vapor can be easily accomplished by adding ice. Once all of the ingredients have been added, the reaction is usually complete within about 4 to 20 minutes. The addition of the solution of sodium carbonate must be completed rapidly once started, for if only a part of the solution is added, some of the piperazine will not be available and remaining acid components will start to react with water which was introduced along with the sodium carbonate. This hydrolysis is undesirable because it introduces more or less monofunctionally into the polymer. Diacid halide appears to be most susceptible to this hydrolysis.

Following the reaction, the polymer may be isolated by steam distilling away the solvent, filtering and washing to remove salts. Vigorous agitation is desirable during solvent removal since the polymer will separate in small particles under these conditions rather than in large masses which may be formed with poor agitation. The isolated polymer may be dried in an air or vacuum oven.

In performing the polymerization batchwise, one is not restricted to the order of additions described above. For example, piperazine or substituted piperazine, acid acceptor, water and the inert organic solvent may all be placed in the agitated reaction vessel to which is then rapidly added a mixture of the acid halide components required. This scheme of addition apparently is satisfactory because the acid halide components are extracted and dissolved into the inert organic phase present in the reactor before they have a chance to hydrolyze with water phase. It is also possible to run the polymerization by adding an aqueous solution of acid acceptor and piperazine to a solvent solution of the halide components contained in a reactor.

Preparation of the elastomers used in the adhesive compositions of the present invention may also be performed by continuous solution/interfacial polymerization. Equipment for continuous polymerization should minimize back-mixing after the reactants have been brought together. A convenient form of apparatus which minimizes back-mixing consists of a long pipeline giving a holdup time of at least about 4 minutes with several low volume mixers placed along the pipeline to insure proper contacting of the system. The first mixer should be placed in the pipeline near the point at which the solutions of acid halide mixture and piperazine are introduced. Better still, the solutions may be introduced directly into the mixer. Following the first mixer, an aqueous solution of acid acceptor is added. Subsequent mixers are required because the system after the addition of acid acceptor tends to separate into two layers until considerable polymerization has taken place. After some polymerization has occurred, the polymer present serves as a surface active agent and permits a relatively stable emulsion to be formed. Once a stable emulsion has been produced, further mixing is not required for the completion of the reaction. Operating in this fashion simulates the batch procedure in which the acid halides and piperazine are quickly brought together and shortly thereafter, the acid acceptor is added rapidly.

The two classes of elastomers used in the present invention may also be prepared from the same reactants by means of solution polymerization. The solvent or solvents employed in this process preferably are similar to those employed in the solution/interfacial polymerization procedure. Methylene chloride, for example, is again satisfactory as a solvent. This method involves dissolving the acid halide components in a portion of a solvent and piperazine or a substituted piperazine plus a tertiary amine acid acceptor in a second portion of the same solvent or a different but miscible organic solvent. The piperazine solution may be added to the acid halide solution or vice versa until the copolymer has reached an adequate molecular weight which usually may be determined by continuously measuring the viscosity of the reaction medium. Isolation of the copolymer may be performed by essentially the same methods as those described above for the isolation of polymer produced by the solution/interfacial polymerization.

It is desirable to employ antioxidants in the present elastomers. Useful antioxidants include such materials as 2,2'-methylenebis(4-methyl - 6 - tertiary-butylphenol), 4,4'-butylidenebis(3-methyl-6-tertiary-butylphenol), symmetrical di-beta-naphthylamine-p-phenylene diamine, and nickel dibutyldithiocarbamate. These materials are effective in preventing oxidative degradation when employed at levels ranging from about ½% to 2% by weight. They may be added to the copolymer by dry mixing with the copolymer followed by passing the mixture through a melt extruder, or they may be introduced into the copolymer by mixing in a Banbury mixer at a temperature above about 200° C. However, it is preferred to add the anti-oxidants to the copolymer during preparation. When this is done, following solvent removal by steam distillation, the polymer is protected against oxidation during the latter stages of isolation. Stabilizers which prevent polymer degradation resulting from exposure to light may also be employed to advantage in the present elastomers. 2,2'-dihydroxy - 4,4'-dimethoxybenzophenone and 2(2'-hydroxy - 5' - methylphenyl)benzotriazole are common representatives of the types of screening agents useful in the compounds.

The other component required to prepare the adhesive compositions of this invention is an oil-soluble phenolic resin or a selected divalent metal salt of such a resin. The use of such resins in "Neoprene" cements is described in U.S. Patent Nos. 2,610,910 and 2,918,442. Oil-soluble phenolic resins generally have relatively low molecular weights and are essentially free of crosslinking. In addition, they usually contain hydrocarbon substituents in order to improve oil solubility. Representative resins include terpene-modified phenolics, furfural phenolics, phenolic-modified coumarone-indene resins and phenolaldehyde resins derived from p-substituted phenols. Of these resins, terpene-modified phenolics and phenol-aldehyde resins derived from p-substituted phenols are preferred.

The terpene-modified phenolics may be prepared by condensing terpene hydrocarbons or alcohols with phenol in the presence of an acid catalyst, followed by resinification of the modified phenol with formaldehyde. The phenolaldehyde resins from p - substituted phenols may be prepared by reacting 1 mole of phenol with about 1 to 2 moles of formaldehyde in the presence of an alkaline condensation catalyst. Phenols having alkyl groups of 3 to 8 carbon atoms as p - substituted are particularly useful for preparing these resins. Examples of such phenols include p - isopropyl phenol, p - tertiary - butyl phenol, p - cyclohexyl phenol, p - tertiary - amyl phenol and p-octyl phenol. Resins derived from p - tertiary - butyl phenol are especially preferred for preparing the compositions of this invention. Phenols having para aryl substituents, such as p - phenyl and p - tolyl phenols, may also be used to prepare resins of this type.

The furfural - phenolics may be obtained by condensing furfural with phenols, preferably with basic catalysts. The phenolic - modified coumarone - indene resins are made by alkylating phenol with coumarone and/or indene in the presence of activated clay or a Friedel-Crafts catalyst.

The divalent metal salts of the oil-soluble phenolic resins which are required for the preparation of certain compositions of this invention may be prepared by agitating a slurry of metal oxide suspended in an organic solvent solution of a resin. A wide variety of solvents may be used, but nonpolar hydrocarbon solvents are preferred. If salt formation proceeds too slowly, a trace of water often accelerates the rate of the reaction. Following agitation of the reaction mixture for 6 to 48 hours, depending on the oxide, solvent and resin employed, the solution of the resin salt may be used directly, but preferably should be decanted or filtered to remove any unreacted metal oxide. The solvent used in salt preparation may be removed by distillation if it is not a desired ingredient in a given adhesive composition. In this case, the residual metal salt is dissolved in the chosen solvent system. The phenol - aldehyde resins derived from p - substituted phenols are preferred for forming salts because of the ease with which they react with metal oxides to form salts containing appreciable concentrations of metal. Magnesium, calcium, cadmium, barium, and lead salts may be used in the present compositions. The presence of these salts in the adhesive compositions of this invention can produce significant increases in high temperature bond strength as will be described and exemplified in more detail hereinafter.

The adhesive compositions of this invention are blends of the polyurethane elastomers and phenolic resins which have been described hereinbefore. The two components should be employed in the proportions specified; that is, 20 parts of polyurethane elastomer and 5 to 80 parts of oil-soluble phenolic resins or resin salt. In terms of percent, this means that compositions included by this invention contain 20 to 80% by weight of polyurethane elastomer based on the combined weight of elastomer and resin, exclusive of other ingredients. Compositions containing less than 5 parts of resin usually lack the necessary tack for forming bonds readily. Compositions containing more than 80 parts of resin generally form bonds having relatively low strengths.

It is difficult to predict in advance the best proportions of a given polyurethane elastomer and resin for a specific application; however, the following generalizations can be used as guides. Polyurethane elastomers of the first class which contain a maximum number of low molecular weight glycol units, —O—B—O—, and a minimum number of diacid units, —D—, tend to soften at lower temperatures than do elastomers containing minimum —O—B—O— units and maximum —D— units. The lower melting elastomers in general exhibit less toughness. Polyurethanes of the second class increase in softening point and toughness as the number of low molecular weight glycol units, —O—B'—O—, increases. For a given resin and elastomer, softening temperature and cohesive strength decrease as the proportion of resin is increased. It should be noted that some resins are more effective than others for lowering the softening temperature of a given elastomer. With these principles, ingredients can be selected and proportions adjusted within the limits of the invention to provide compositions which are acceptable for bonding a great variety of materials.

Preparation of the adhesive compositions of this invention can be accomplished by blending the required elastomer and phenolic resin ingredients at temperatures around 200° C. in equipment such as a Banbury mixer. Similar results can be obtained by passing a dry mixture of materials through a heated extruder. The compositions can also be formed by adding the required ingredients to a solvent or solvent mixture which is capable of dissolving both the polyurethane elastomer and resin. This solvent technique avoids the need for heavy equipment and provides the compositions in a form which permits convenient application to most substrates. Any of the solvents suggested hereinbefore for use in the preparation of the polyurethane elastomers are suitable for preparing solutions of the compositions of this invention. In addition, certain solvents which would be reactive toward bishaloformates may be used alone or in solvent mixtures for dissolving the compositions. The addition of a small amount of a lower alcohol to a suitable halogenated solvent yields particularly useful solvent mixtures. A mixture of 95 parts of methylene chloride and 5 parts of 2B ethyl alcohol is a preferred example of this type. Alcohols higher than ethanol can be used in greater proportion to advantage on occasion.

Bond formation with the adhesives of this invention may be accomplished by conventional procedures. When the compositions are used as solution adhesives, bond formation involves applying, by usual means, one or more coats of adhesive solution to the surfaces to be joined and bringing the surfaces together while the coating of adhesive is still wet with solvent. When more than one coat of adhesive is applied, all but the last coat should be allowed to dry prior to application of the next coat. When very porous substrates such as cloth are to be joined, sufficient coats of adhesive should be applied to assure the presence of adhesive on the surface. With canvas, as many as 3 to 5 coats of adhesive solution may be required to achieve this end, depending on the viscosity and percent solids of the solution. Non-porous substrates seldom require more than two coats of adhesive to furnish an adequate layer of material on the substrate surface.

The compositions may also be used as contact adhesives which retain adhesive character for periods of time ranging from 24 to beyond 48 hours. When used in this fashion, bond formation is accomplished by coating the substrate as described previously and pressing at room temperature before the specific composition involved loses adhesive characteristics.

Bonds may also be formed from solution coated surfaces by means of heat-activation or solvent-activation. Heat-activation is possible with some resins at any time up to a month or more after the surfaces are coated with adhesive. Bonds are formed by bringing such surfaces together and heating above the softening point of the particular composition being used or alternatively, one or both of the surfaces to be joined are heated separately and then pressed together. Once the bonds cool to room temperature, they exhibit their ultimate strength. Solvent-activation may also be employed for bond formation after relatively long periods of time have elapsed from the time of surface coating. Any of the solvents which are suitable for dissolving the compositions of this invention may be used to activate adhesive coatings. Solvent is wiped on one or both coated surfaces and the surfaces are brought together quickly and pressed.

The compositions of this invention may also be used as hot-melt adhesives. No solvent is required when the compositions are used in this manner. The adhesive composition is heated above its softening temperature and applied to the surface to be coated by means such as a knife coater or a calendar. Due to the relatively high viscosity of the compositions in the absence of solvent, brushing and spraying are not convenient. Coated surfaces may be joined immediately while still hot or they may be allowed to cool and heat-activated at a later time. Bond formation by this procedure is particularly useful for the continuous fabrication of laminated materials. In forming bonds by this method, application of the adhesive and the bond formation should be effected under a positive pressure as the relatively high viscosity of the molten compositions makes proper wetting of the surfaces difficult. Bonds may also be prepared by placing cold adhesive in the form of a film or a ground powder, for example, between the surfaces to be bonded. When this "sandwich" is heated in a press above the softening point, the solid adhesive flows to form a uniform layer between the adjacent surfaces. In order to complete bond formation, it is only necessary to allow the assembly to cool to ambient temperatures.

Somewhat similar results are obtained when the phenolic resins of the instant adhesives are replaced with equal weights of epoxy resins having melting points in the range of 50–100° C. Epon 1001, M.P. 65–75° C., epoxy equivalent 450–550, available from Shell Chemical Co., may be cited as being representative of suitable epoxy resins. Blends of the polyurethane elastomers of this invention with epoxy resins appear to be particularly useful for bonding vinyl plastics.

The following examples, in which parts and percents are by weight unless otherwise noted, are illustrative of the present invention and are not intended to serve as a limitation of the scope thereof.

PREPARATION OF POLYURETHANE ELASTOMERS

Elastomer A

A mixture of 500 grams of polytetramethyleneether glycol (number average molecular weight about 1000) and 90 grams of 1,4-butanediol is added to 1 liter of liquefied phosgene contained in a 2 liter flask. This mixture is refluxed for 12 hours. The temperature of the mass during this step is about 9° C. Excess phosgene is removed from the reaction product by heating to 25° C. and passing dry nitrogen through the mass which is agitated vigorously. This treatment is continued until the content of phosgene is reduced to below 100 p.p.m. (The concentration of phosgene in the bischloroformate is determined by titration with a solution of triethylamine in benzene. In this titration, one mole of phosgene is equivalent to one mole of triethylamine. The end point is determined potentiometrically.) About 770 grams of mixed bischloroformate is obtained.

About 250 grams of the mixture of bischloroformates produced above and 29.3 grams of adipyl chloride are added to 2250 ml. of methylene chloride contained in a 1 gallon Waring Blendor. The blender is turned on and 57.8 grams of anhydrous piperazine is added in about 30 seconds. Agitation is continued for one minute after which 800 ml. of sodium carbonate solution, prepared using 10 grams of sodium carbonate per 100 ml. of water, is added. Agitation is continued for an additional 20 minutes and 2.8 grams of 2,2'-methylenebis(4-methyl-6-tertiary-butyl-phenol) is added and blended in. About 1 liter of water is added to the blender and steam is passed through the mass to remove methylene chloride. Agitation is continued in the blender during this latter operation and the polymer precipitates in the form of fine particles as the solvent is removed. Polymer is collected on a filter and is washed with hot water until the sulfated ash content of the polymer on a dry basis is reduced to 0.1 to 0.2% by weight. The washed polymer is dried in an air oven at a temperature of about 120° C. for 5 hours. The approximate water content of the dry polymer is 0.5%.

The quantities of reactants used in preparing this copolymer correspond to 1 mole of polytetramethyleneether glycol, 2 moles of 1,4-butanediol, 1 mole of adipyl chloride and 4.2 moles of piperazine. Piperazine is employed in excess but only about 4 moles are incorporated into the polymer.

Elastomer B

A mixture of bischloroformates is prepared by reacting 500 grams of polytetramethyleneether glycol (number average molecular weight about 1000) and 104 grams of neophenyl glycol with phosgene following the procedure given for Elastomer A.

A portion of the mixed bischloroformates is converted to polymer by the procedure given for Elastomer A, but at ⅕ the scale. About 50 grams of mixed bischloroformate, 5.78 grams of adipyl chloride and 11.42 grams of anhydrous piperazine are employed. Other reagents are employed in ⅕ the amount used in Elastomer A. Preparation is carried out in a 1-quart Waring Blendor. The polymer so produced contains the equivalent of 1 mole of polytetramethyleneether glycol, 2 moles of neopentyl glycol, 1 mole of adipyl chloride and 4.0 moles of piperazine.

Elastomer C

A mixture of 500 grams of polytetramethyleneether glycol and 90 grams of butanediol-1,4 is converted to bischloroformates by the procedure described for preparing Elastomer A. About 250 grams of the bischloroformate mixture is added to about 2250 ml. of methylene chloride contained in a 1-gallon Waring Blendor. The blender is turned on and about 43.5 grams of anhydrous piperazine is added in about 30 seconds. After this step, the preparation of Elastomer C follows the procedure used for making Elastomer A.

The quantities of reactants used in preparing this polymer correspond to 1 mole of polytetramethyleneether glycol, 2 moles of 1,4-butanediol and 3.15 moles of piperazine. Only about 3 moles of the piperazine employed is actually incorporated into the polymer.

PHENOLIC RESIN COMPONENTS

The following resins are employed in the examples presented hereinafter.

Resin A

A p-tert.-butyl phenol-formaldehyde resin, soluble in alcohols higher than isopropanol; softening point 90–100° C.; specific gravity 1.105–1.115. Available from Reichold Chemicals, Incorporated, White Plains, New York as "Varcum" 921 Resin.

Resin B

A p-tert.-butyl phenol-formaldehyde resin, soluble in alcohols higher than isopropyl alcohol and in most other organic solvents; softening point 88–104.5° C.; specific gravity 1.10. Available as "Bakelite" CKR–1634 Resin from Union Carbide Plastics Company, New York, New York.

Resin C

A terpene modified phenolic resin, soluble in alcohols higher than isopropyl alcohol and most other organic solvents; melting point 133–152° C.; specific gravity 1.09. Available as "Durez" 12603 Resin from Durez Plastics Division, Hooker Chemical Corporation, North Tonawanda, N.Y.

Resin D

The magnesium salt of Resin B. This salt is prepared by mixing 100 parts of Resin B, 10 parts of magnesium oxide, 1 part water and 167 parts of toluene for about 6 hours. The toluene is then removed by evaporation. The residual resinous mass is the desired product.

Resin E

A p-tert.-butyl phenol-formaldehyde resin; softening point 80–91° C. Available from Reichold Chemicals, Incorporated, White Plains, N.Y., as "Varcum" 871 Resin.

GENERAL PROCEDURE FOR PREPARING ADHESIVE COMPOSITIONS

The adhesive compositions employed in the examples which appear hereinafter are prepared by adding a total of 100 grams combined weight of polyurethane elastomer and phenolic resin component in the ratios specified to a 1-quart Waring Blendor. Mixed solvent containing 95 parts of methylene chloride and 5 parts of 2B ethyl alcohol is then added to the blender in an amount to provide the desired solids content. The top of the blender is covered and the mixture is agitated for about 15 minutes. Vigorous, shearing agitation for this length of time readily effects solution of the adhesive ingredients if the elastomer is introduced as small granules of the type yielded directly by the preparative procedures given hereinbefore. When less vigorous agitation is available or the elastomer is added as larger particles, the time required to dissolve the elastomer is increased. The resulting solutions are stored in closed containers until required for use.

EXAMPLE 1

A series of seven adhesive compositions is prepared in a 95 methylene chloride/5 2B ethyl alcohol solvent mixture using the procedure described above. All solutions contain total solids of 15% by weight.

The compositions are evaluated by the following test procedure. Adhesive solution is brushed on one surface of canvas test strips. Between 3 and 5 coats of solution are applied in order to assure the presence of a uniform coating of adhesive on the canvas surface. Following the last coat, the samples are allowed to dry for about 4 hours. Bonds are formed by placing two coated canvas strips in an oven until the canvas strips reach the oven temperature. They are then removed from the oven and their coated surfaces are immediately pressed together by hand rolling. The test samples are allowed to stand at room temperature for at least 24 hours and bond strength is determined by 180° peel adhesion tests run in accordance with ASTM D 419–39.

The solids composition of the adhesives and their bond strengths at room temperature are presented in Table I. Table I also includes bond strength measurements made at 100° C. and 150° C. and the oven temperature required for each of the compositions.

Similar bonds are formed when the compositions are used as solvent adhesives. In this instance, bonds are formed at room temperature by pressing the coated surfaces together immediately after application of the last coat of adhesive solution.

EXAMPLE 2

This example illustrates the variety of substrates which may be effectively joined by the adhesives of this invention. Adhesive D of Example 1 is used to form the test bonds. Bonds are formed by applying 3 to 5 coats of adhesive solution to porous adherends and 2 coats to non-porous adherends with 1 to 2 hours elapsing between coats in the latter case. The coated adherends are allowed to dry for about four hours after the final adhesive coat is applied. They are then heated for 3 minutes at 150° C. and pressed for 30 seconds at 25 p.s.i. The samples are tested 4 days after preparation.

The following combinations of materials are fabricated into test bonds and bond strength determined by the 180° peel test of ASTM D 419–39.

| Test bond substrates: | 180° peel at R.T., lb./in. |
|---|---|
| Canvas/polyurethane elastomer | 58 |
| Canvas/plasticized polyvinyl chloride | 68 |
| Canvas/glass | 50 |
| Canvas/aluminum | 25 |
| Canvas/steel | 35 |
| Canvas/wood | 50 |
| Canvas/nylon fabric | 23 |

Shear strength was determined on the following bonds formed between rigid adherends.

| Test bond substrates: | Shear strength, p.s.i. |
|---|---|
| Steel/steel | 880 |
| Aluminum/aluminum | 822 |
| Wood/wood | 535 |
| Glass/glass | [1] 257 |

[1] Failure resulted from the glass breaking, not from shearing of the test bond.

EXAMPLE 3

A 20% adhesive solution in 95 methylene chloride/5 2B ethanol solvent is prepared by the general procedure given hereinbefore using 50 grams of Elastomer C and 50 grams of Resin B. Canvas-to-canvas bonds are formed with this adhesive by applying several coats of solution in the manner described in Example 1. Bonds are formed at room temperature immediately after the application of the last coat of solution by pressing the strips together for 10 seconds at 200 p.s.i. The 180° peel bond strength obtained is in excess of 20 lb./in. at room temperature. Bonds of about equivalent strength are produced when the composition is used as a contact adhesive 1, 2, 4, 7, 24 and 48 hours following the final coat of solution. Bond formation is accomplished in this latter instance by pressing at 200 p.s.i. for 10 seconds at room temperature.

TABLE I

| Sample | A | B | C | D | E | F [1] | G |
|---|---|---|---|---|---|---|---|
| Composition, Parts/100 Parts of Solids: | | | | | | | |
| Elastomer A | 75 | 50 | | 50 | 50 | 50 | |
| Elastomer B | | | 50 | | | | |
| Elastomer C | | | | | | | 50 |
| Resin A | 25 | | | | | | |
| Resin B | | 50 | 50 | | 25 | | 50 |
| Resin C | | | | 50 | 25 | | |
| Resin D | | | | | | 50 | |
| Oven Temperature Required, ° C. | <70 | <70 | <70 | 100 | <70 | | <70 |
| 180° Peel at Room Temperature, lb./in. | 44 | 31 | 30 | 40 | 40 | 23 | 25 |
| 180° Peel at 100° C., lb./in. | 14 | 1 | 1 | 16 | 7 | 23 | 1 |
| 180° Peel at 150° C., lb./in. | 3 | 0 | 0 | 0 | | 14 | 0 |

[1] Bonds formed by using composition as a solvent adhesive.

EXAMPLE 4

A 20% adhesive solution in 95 methylene chloride/5 2B ethanol solvent is prepared by the procedure given hereinbefore using 50 grams of Elastomer A and 50 grams of Resin E. Using this composition as a contact adhesive, canvas-to-canvas bonds having strengths in excess of 30 lb./in. are formed by pressing 10 seconds at 200 p.s.i. and room temperature, 1, 2, 4, 7 and 24 hours following the last application of adhesive solution.

As many widely different embodiments of this invention may be made without departing from the spirit and scope thereof, it is to be understood that this invention is not limited to the specific embodiments thereof except as defined in the appended claims.

What is claimed is:

1. A solvent-free thermoplastic adhesive composition consisting essentially of, in relative proportions, (a) 20 parts by weight of a thermoplastic-secondary polyurethane elastomer and (b) 5 to 80 parts by weight of an oil-soluble phenolic resin selected from the group consisting of terpene-modified phenolic resins, furfural phenolic resins, phenolic-modified coumarone-indene resins and p-substituted phenol-aldehyde resins and mixtures thereof, said polyurethane elastomer being selected from the group consisting of the essential units —O—G—O—, —O—B—O—, and —D—, all connected by the bi-acyl radical

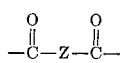

and of the essential units —O—G—O— and —O—B'—O connected by the same bi-acyl radical, wherein

is a biradical obtained by removing the hydroxyl hydrogen atoms of a polyalkylene-ether glycol having a molecular weight of 800 to 3000, —Z— is a biradical obtained by removing the amine hydrogens from a diamine selected from the group consisting of piperazine, 2-methylpiperazine, 2,5-dimethylpiperazine, and 2,3,5,6-tetramethylpiperazine, —O—B—O— is a biradical obtained by removing the hydroxyl hydrogen atoms from a glycol having a molecular weight of less than about 200, —O—B'—O is a biradical obtained by removing the hydroxyl hydrogen atoms from a glycol selected from the group consisting of butanediol-1,4, neopentyl glycol, and mixtures thereof, and —D— is selected from the group consisting of —CH$_2$—CH$_2$, —CH$_2$—CH$_2$—CH$_2$—CH$_2$— and mixtures thereof, with the molar ratios of said essential units of said polyurethane elastomer in the order given being 1.0:1–3:0.75–1.5 and 1.0:1.0–10.0, and with the proviso that the first mentioned polyurethane elastomer, the combined units

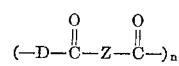

therein are so situated that the average value of $n$ is greater than one.

2. The adhesive composition as recited in claim 1 and additionally, antioxidant incorporated therein.

3. The solvent solution of adhesive composition as recited in claim 1.

4. The adhesive composition as recited in claim 1 wherein the essential unit —O—G—O— of the polyurethane elastomer (a) is derived from polytetramethyleneether glycol.

5. The adhesive composition as recited in claim 1 wherein the essential unit —O—G—O— of the polyurethane elastomer (a) is derived from polypropyleneether glycol.

6. A solvent-free thermoplastic adhesive composition consisting essentially of, in relative proportions, (a) 20 parts by weight of a thermoplastic-secondary polyurethane elastomer and (b) 5 to 80 parts by weight of an oil-soluble phenolic resin selected from the group consisting of terpene-modified phenolic resins, furfural phenolic resins, phenolic-modified coumarone-indene resins and p-substituted phenol-aldehyde resins and mixtures thereof, said polyurethane elastomer being selected from the group consisting of the essential units —O—G—O—,

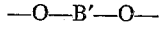

and —D—, all connected by the bi-acyl radical

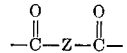

and of the essential units —O—G—O— and —O—B'—O connected by the same bi-acyl radical, wherein

—O—G—O— is a biradical obtained by removing the hydroxyl hydrogen atoms of a polyalkylene ether glycol having a molecular weight of 800 to 3000, —Z— is a biradical obtained by removing the amine hydrogens from a diamine selected from the group consisting of piperazine, 2-methylpiperazine, 2,5-dimethylpiperazine, and 2,3,5,6-tetramethylpiperazine, —O—B'—O is a biradical obtained by removing the hydroxyl hydrogen atoms from a glycol selected from the group consisting of butanediol-1,4, neopentyl glycol, and mixtures thereof, and —D— is selected from the group consisting of —CH$_2$—CH$_2$, —CH$_2$—CH$_2$—CH$_2$—CH$_2$—, and mixtures thereof, with the molar ratios of said essential units of said polyurethane elastomer in the order given being 1.0:1–3:0.75–1.5 and 1.0:1.0–10.0, and with the proviso that for the first mentioned polyurethane elastomer, the combined units

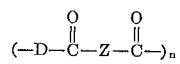

therein are so situated that the average value of $n$ is greater than one.

7. A solvent-free thermoplastic adhesive composition consisting essentially of, in relative proportions, (a) 20 parts by weight of a thermoplastic-secondary polyurethane elastomer and (b) 5 to 80 parts by weight of an oil-soluble phenolic resin selected from the group consisting of terpene-modified phenolic resins, furfural phenolic resins, phenolic-modified coumarone-indene resins and p-substituted phenol-aldehyde resins and mixtures thereof, said polyurethane elastomer consisting of the essential units —O—G—O—, —O—B—O—, and —D—, all connected by the bivalent acyl radical

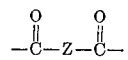

wherein —O—G—O— is a biradical obtained by removing the hydroxyl hydrogen atoms of a polyalkylene ether glycol having a molecular weight of 800 to 3000, —Z— is a biradical obtained by removing the amine hydrogens from a diamine selected from the group consisting of piperazine, 2-methylpiperazine, 2,5-dimethylpiperazine, and 2,3,5,6-tetramethylpiperazine,

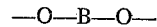

is a biradical obtained by removing the hydroxyl hydrogen atoms from a glycol having a molecular weight of less than about 200, and —D— is selected from the group consisting of —CH$_2$—CH$_2$,

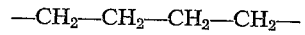

and mixtures thereof, with the molar ratios of said essential units being 1.0:1–3:0.75–1.5, and with the proviso that the combined units

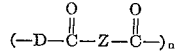

in said polyurethane elastomer are so situated that the average value of $n$ is greater than one.

8. A solvent-free thermoplastic adhesive composition consisting essentially of, in relative proportions, (a) 20 parts by weight of a thermoplastic-secondary polyurethane elastomer and (b) 5 to 80 parts by weight of an oil-soluble phenolic resin selected from the group consisting of terpene-modified phenolic resins, furfural phenolic resins, phenolic-modified coumarone-indene resins and p-substituted phenol-aldehyde resins and mixtures thereof, said polyurethane elastomer consisting of the essential units —O—G—O— and —O—B'—O connected by the bi-acyl radical

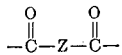

wherein —O—G—O— is a biradical obtained by removing the hydroxyl hydrogen atoms of a polyalkylene ether glycol having a molecular weight of 800 to 3000 —Z— is a biradical obtained by removing the amine hydrogens from a diamine selected from the group consisting of piperazine, 2-methylpiperazine, 2,5-dimethylpiperazine, and 2,3,5,6-tetramethylpiperazine, and —O—B'—O— is a biradical obtained by removing the hydroxyl hydrogen atoms from a glycol selected from the group consisting of butanediol-1,4, neopentyl glycol, and mixtures thereof, with the molar ratios of said essential units being 1.0:1.0–10.0.

References Cited
UNITED STATES PATENTS 3,284,392  11/1966  Steinfink _____ 260—841

SAMUEL H. BLECH, *Primary Examiner.*

MURRAY TILLMAN, *Examiner.*

P. LIEBERMAN, *Assistant Examiner.*